(12) United States Patent
Chang et al.

(10) Patent No.: US 11,112,641 B2
(45) Date of Patent: Sep. 7, 2021

(54) DISPLAY PANEL

(71) Applicant: HANNSTAR DISPLAY CORPORATION, Taipei (TW)

(72) Inventors: Chung-Lin Chang, Kaohsiung (TW); Hsuan-Chen Liu, Kaohsiung (TW); Kun-Tsai Huang, Kaohsiung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/745,302

(22) Filed: Jan. 16, 2020

(65) Prior Publication Data

US 2020/0241355 A1 Jul. 30, 2020

(30) Foreign Application Priority Data

Jan. 28, 2019 (CN) .......................... 201910078775.3

(51) Int. Cl.
  *G02F 1/1335* (2006.01)
  *G02F 1/1333* (2006.01)
  *G02F 1/1343* (2006.01)

(52) U.S. Cl.
  CPC .. *G02F 1/133512* (2013.01); *G02F 1/133514* (2013.01); *G02F 1/133388* (2021.01); *G02F 1/134372* (2021.01); *G02F 2201/121* (2013.01); *G02F 2201/123* (2013.01); *G02F 2201/56* (2013.01)

(58) Field of Classification Search
  CPC ... G02F 2001/133388; G02F 1/133512; G02F 2001/134372; G02F 1/133514; G02F 1/133516; G02F 2001/136222; G02F 2201/52; G02F 1/133707; G02F 1/134372; G02F 2201/56; G02F 1/133388; G09G 3/2003; G09G 2300/0452; G09G 2300/0443; G09G 3/3607; G09G 3/3611; G09G 5/02; G02B 5/201; H01L 27/322; H01L 27/3213; H01L 27/3218; H01L 27/3211
  See application file for complete search history.

(56) References Cited

U.S. PATENT DOCUMENTS

| 2009/0309813 A1* | 12/2009 | Fujita | G02F 1/133512 345/55 |
| 2010/0214195 A1* | 8/2010 | Ogasawara | G02F 1/136286 345/55 |
| 2010/0289994 A1* | 11/2010 | Nonaka | G09G 3/20 349/108 |

(Continued)

*Primary Examiner* — Jia X Pan
(74) *Attorney, Agent, or Firm* — Winston Hsu

(57) ABSTRACT

The present invention provides a display panel having a display region and a peripheral region, and the display panel includes a plurality of pixel units including at least one inner pixel unit and at least one first peripheral pixel unit, and a shielding layer. A shape of the display region is non-rectangular. The inner pixel unit is disposed in the display region and includes at least one inner sub-pixel unit. The first peripheral pixel unit is disposed in both the display region and the peripheral region and includes at least one first peripheral sub-pixel unit. At least a part of the shielding layer is disposed in the peripheral region, and the at least a part partially overlaps the first peripheral pixel unit. A structure of the first peripheral pixel unit is different from a structure of the inner pixel unit.

14 Claims, 8 Drawing Sheets

(56) References Cited

U.S. PATENT DOCUMENTS

| | | | |
|---|---|---|---|
| 2016/0120005 A1* | 4/2016 | Wu | H05B 33/145 |
| | | | 313/505 |
| 2018/0107084 A1* | 4/2018 | Hirata | G02F 1/1345 |
| 2018/0136513 A1* | 5/2018 | Liu | G02F 1/133514 |
| 2018/0149932 A1* | 5/2018 | Nakamura | G02F 1/134309 |
| 2019/0140026 A1* | 5/2019 | Nakanishi | H01L 51/50 |
| 2019/0212619 A1* | 7/2019 | Kanehiro | G02F 1/134363 |

* cited by examiner

DISPLAY PANEL

BACKGROUND OF THE INVENTION

1. Field of the Invention

The present invention relates to a display panel, and more particularly, to a display panel with non-rectangular display region.

2. Description of the Prior Art

Because of its lightweight appearance, low power consumption and radiation-free contamination, the display panel has been widely used in various portable or wearable electronic products such as notebooks, smart phones and watches, as well as vehicle displays, to provide more convenient information transmission and display. In recent technology, the display panel is also developed into various shapes different from the rectangular shape, such as circle and polygons, so that the design and application of the display panel are more flexible. However, due to the non-rectangular design, sub-pixels in one pixel that overlap the non-rectangular edge will have inconsistent light transmitting areas, so when the sub-pixels are driven with the same grey level, the brightness of the generated light with different colors are inconsistent, thereby generating unwanted color and obvious color shift and reducing display quality of the display panel. Therefore, improvement of the display quality of non-rectangular display panels is an urgent subject for technicians in the related field.

SUMMARY OF THE INVENTION

It is therefore an objective of the present invention to solve the above-mentioned technical problem by providing a display panel with a non-rectangular display region and improving the display quality of the display panel at the edge of the display region.

To solve the above technical problem, the present invention provides a display panel having a display region and a peripheral region which includes a plurality of pixel units, and a shielding layer. A shape of the display region is non-rectangular. The pixel units include at least one inner pixel unit and at least one first peripheral pixel unit. The inner pixel unit is disposed in the display region, and the inner pixel unit includes at least one inner sub-pixel unit. The first peripheral pixel unit is disposed in both the display region and the peripheral region, and the first peripheral pixel unit includes at least one first peripheral sub-pixel unit. At least a part of the shielding layer is disposed in the peripheral region, and the at least a part of the shielding layer partially overlaps the first peripheral pixel unit. A structure of the first peripheral pixel unit is different from a structure of the inner pixel unit.

To solve the above technical problem, the present invention further provides a display panel having a display region and a peripheral region which includes a plurality of pixels. A shape of the display region is non-rectangular. At least one first peripheral pixel is disposed in both the display region and the peripheral region, in which the first peripheral pixel includes a first peripheral pixel unit and a first shielding block, the first peripheral pixel unit includes at least one first sub-pixel unit, the first shielding block includes at least one first sub-shielding block, and the first peripheral sub-pixel unit at least partially overlaps the first sub-shielding block corresponding to the first peripheral sub-pixel unit. At least one inner pixel is disposed in the display region, in which the inner pixel includes an inner pixel unit and a second shielding block, the inner pixel unit includes at least one inner sub-pixel unit, the second shielding block comprises a second sub-shielding block, and the inner sub-pixel unit partially overlap the second sub-shielding block. A structure of the first peripheral pixel unit is different from a structure of the inner pixel unit.

In the display panel of the present invention, the transmittance of the peripheral sub-pixel unit of the first peripheral pixel unit can be adjusted to be less than the transmittance of the inner sub-pixel unit, so that the brightness of light generated from the sub-pixels of the peripheral sub-pixel unit corresponding to the first peripheral pixel unit can be diluted, and the display quality of the display panel can be improved.

These and other objectives of the present invention will no doubt become obvious to those of ordinary skill in the art after reading the following detailed description of the preferred embodiment that is illustrated in the various figures and drawings.

DETAILED DESCRIPTION

In order to enable those skilled in the art to further understand the present invention, preferred embodiments of the present invention are listed below, and the composition and intended effects of the present invention will be described in detail with reference to the accompanying drawings. It should be noted that the drawings are simplified schematic diagrams, therefore, only the components and combination relationships related to the present invention are shown to provide a clearer description of the basic architecture or implementation method of the present invention, while the actual components and layout may be more complicated. In addition, for convenience of explanation, the elements shown in the various drawings of the present invention are not drawn to the actual number, shape and size, and the detailed scale can be adjusted according to the design requirements.

Figure 1:
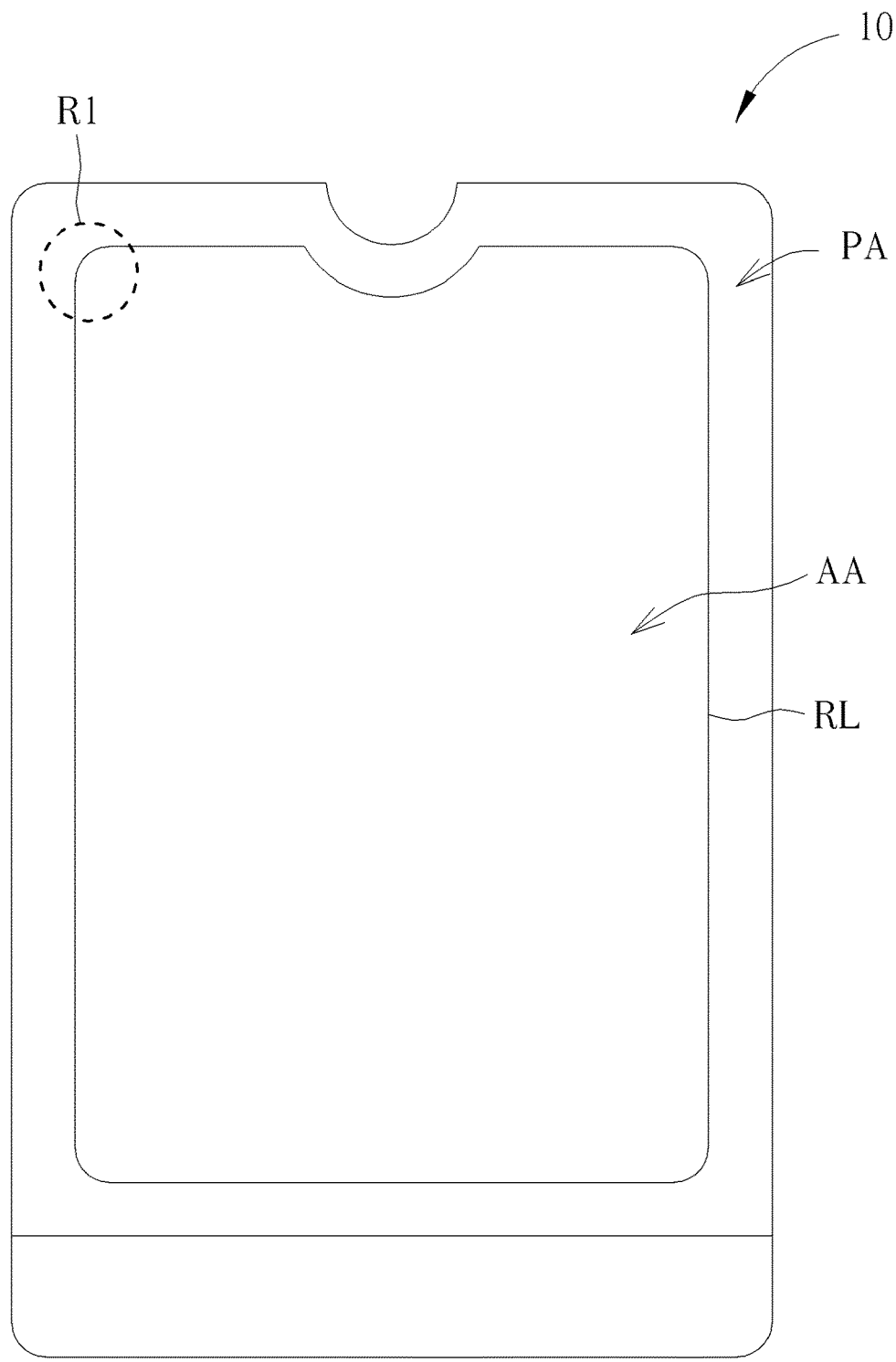
FIG. 1 is a schematic top view of a display panel according to an embodiment of the present invention.

FIG. 1 is a schematic top view of a display panel according to an embodiment of the present invention. As shown in FIG. 1, the display panel 10 includes a display region AA and a peripheral region PA located on at least one side of the display region AA. In the present invention, the display region AA is a non-rectangular display region. In this embodiment, the peripheral region PA surrounds the display region AA, but not limited thereto. The reference line RL in FIG. 1 may represent an edge of the display region AA. For example, the display region AA may have a non-rectangular shape according to the non-rectangular outline of the display panel 10, or the display region AA may have a non-rectangular shape because of requirements for increasing the area of the display region AA and disposing components (such as imaging components and/or biometric identification components) in at least one area outside the display region AA, but not limited thereto. In this embodiment, the display region AA may have rounded edges at corners, such as the edge located in the area R1, or one side of the display region AA may also have curved edges. Moreover, the display region AA may also have a straight edge, but not limited thereto. The curved edge of the display region AA may also be adjusted according to actual requirements. It is worth mentioning that the reference line RL may be, for example, the outline of the display region AA given by the designer at the design stage of the display panel 10 or the outline of the display region AA perceived by user while using the display panel.

Figure 2:
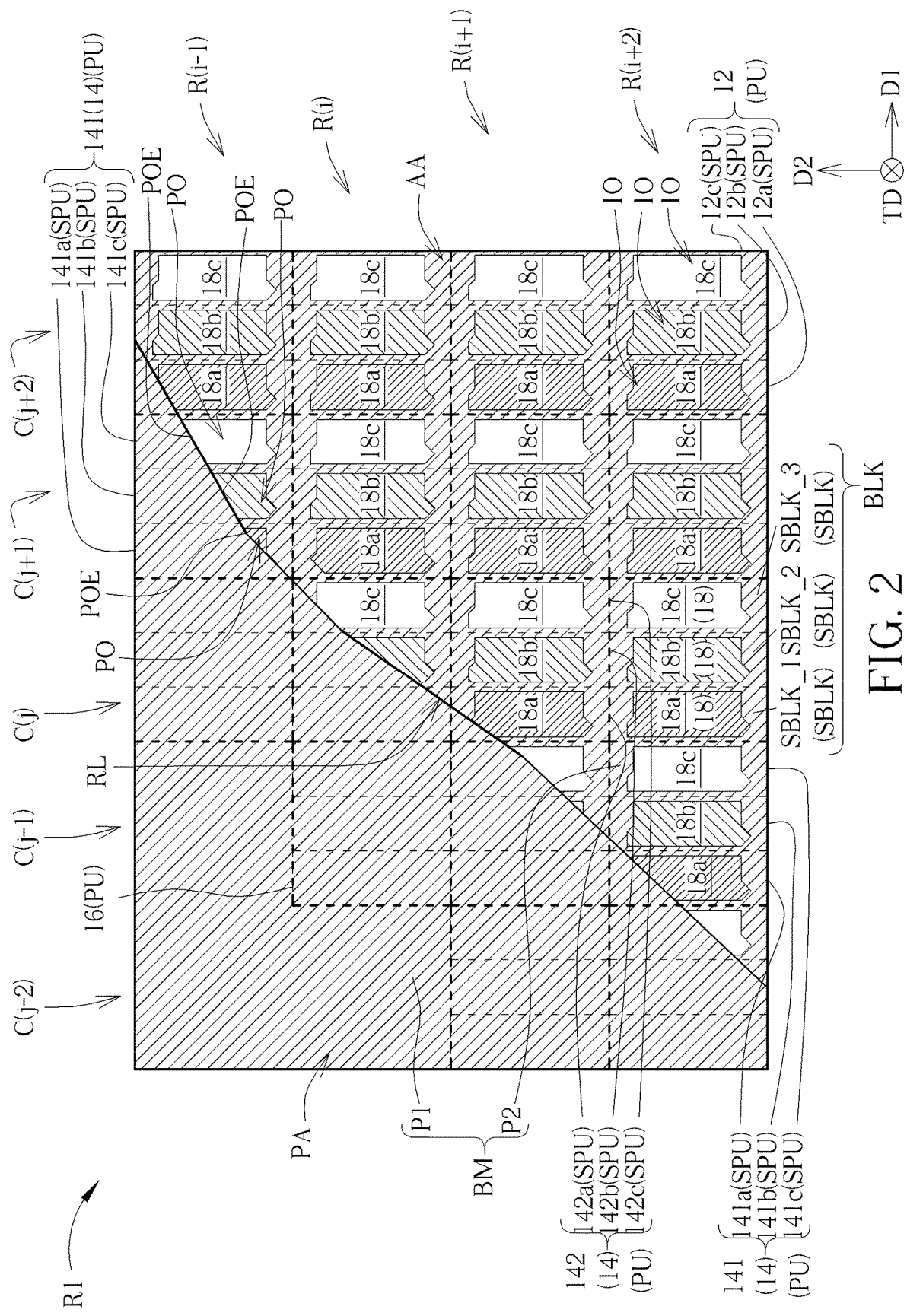
FIG. 2 is an enlarged schematic diagram of a region R1 of FIG. 1.

The structure of the display panel 10 located near the curved edge of the display region AA will be further detailed below. Please refer to FIG. 2, which is an enlarged schematic diagram of a region R1 of FIG. 1, in which the structure in region R1 of FIG. 2 is taken as an example, but not limited thereto. As shown in FIG. 2, the display panel 10 may include a plurality of pixel units PU and a shielding layer BM, and the shielding layer BM may be used to shield the peripheral region PA and define the boundary between the display region AA and the peripheral region PA. In addition, the shielding layer BM can also shield light leakage and/or light reflection regions of each pixel unit PU in the non-rectangular display region AA. For example, a portion of the shielding layer BM is located in the display region AA and may have a plurality of openings for allowing light to pass therethrough and defining the display regions of the sub-pixels respectively, but not limited thereto. In other words, the shielding layer BM may include a first portion P1 and a second portion P2, in which the first portion P1 is disposed in the peripheral region PA and the second portion P2 is disposed in the display region AA, but not limited thereto. In other embodiments, one shielding layer is disposed in the peripheral region PA, and another one shielding layer is disposed in the display region AA, or no shielding layer is disposed in the display region AA. The display panel 10 may include a plurality of pixels, each pixel may include a pixel unit PU and a shielding block BLK, and the shielding block BLK overlaps the pixel unit PU. The "overlap" mentioned herein may be defined as an overlap in a top view direction TD of the display panel 10. For example, the shielding blocks BLK may shield scan lines, data lines and thin film transistors in the pixel units PU located in the display region AA, but not limited thereto. In this embodiment, the shielding block BLK is a part of the shielding layer BM, but not limited thereto. As shown in FIG. 2, the openings of the shielding layer BM can be divided into a plurality of inner openings 10 each surrounded by the second portion P2 and a plurality of peripheral openings PO surrounded by the first portion P1 and the second portion P2. The reference line RL, which is the boundary between the display region AA and the peripheral region PA, may be formed, for example, by connecting outer edges of the outermost peripheral openings PO. For example, the peripheral opening PO may have an inclined edge POE corresponding to a part of the reference line RL, and the curved edge of the display region AA may be formed by connecting the inclined edges POE. The pixel unit PU has four sides (upper, lower, left and right sides) and the inclined edge POE is not parallel to the sides of the pixel unit PU. The inclined edge POE may be a straight line or a curve, but not limited thereto. In other words, in the present invention, the shielding layer BM in the display panel 10 has a plurality of peripheral openings PO, and the outer edge of each peripheral opening PO is equal to or similar to a part of the reference line RL, so at least a part of the peripheral openings PO in the plurality of peripheral openings PO has inclined edges POE that are not parallel to the sides of the pixel unit PU, the inclined edge POE can be a straight line or a curve and is equal to or similar to a part of the reference line RL, so that the edge of the display region AA of the display panel 10 will be the same as or similar to the reference line RL (the predetermined outline of the display region AA) given by the designer at the design stage. Because of the curved reference line RL of the display region AA, the size of the peripheral opening PO with the inclined edge POE is less than the size of the inner opening IO. For example, the inner openings IO may have the same size, and each peripheral opening PO with the inclined edge POE may have a corresponding size as the reference line RL crosses the position of the sub-pixel. In some embodiments, the second portion P2 may have a mesh shape, but not limited thereto. The present invention does not limit the shapes of the inner openings IO and the peripheral openings PO. The shielding layer BM is a light shielding layer (such as a black matrix layer) and may include a light shielding material, such as photoresist, resin or ink, but not limited thereto.

As shown in FIG. 2, the pixel unit PU may be completely disposed in the display region AA, disposed in both the display region AA and the peripheral region PA, or completely disposed in the peripheral region PA. Each pixel includes one pixel unit PU, and in FIG. 2, only the pixel units PU are labeled because the areas of the pixel and the pixel unit PU are the same, but not limited thereto. The pixel units PU may be arranged into a plurality of pixel unit rows or a plurality of pixel unit columns in a similar array manner, for example, but not limited thereto. Since the non-rectangular display region AA has the curved edge, the numbers of pixel units PU of pixel unit rows or pixel unit columns intersecting the curved edge may be different. For example, the extending direction of the pixel unit row and the extending direction of the pixel unit column may be the first direction D1 and the second direction D2, respectively, but are not limited thereto. In some embodiments, the arrangement of the pixel units PU may not be limited to the array arrangement of FIG. 2, and may be correspondingly adjusted according to actual requirements, for example, adjacent pixel unit rows or adjacent pixel unit columns may be arranged in a staggered manner. In some embodiments, the inclined edge POE of each peripheral opening PO may not be parallel to the first direction D1 and the second direction D2.

In detail, the plurality of pixels of the display panel 10 may include at least one inner pixel and at least one peripheral pixel. The inner pixel includes an inner pixel unit 12 and a shielding block BLK, the inner pixel unit 12 is disposed in the display region AA and partially overlaps the second part P2, and the inner pixel unit 12 does not overlap the peripheral region PA, that is, each inner pixel unit 12 is completely positioned in the display region AA and does not overlap the first part P1 of the shielding layer BM, and the shielding block BLK of the inner pixel includes a plurality of openings to define the display regions of the inner pixels. The peripheral pixel includes a peripheral pixel unit 14 and a shielding block BLK, the peripheral pixel unit 14 is disposed in both the display region AA and the peripheral region PA, that is, the peripheral pixel unit 14 intersects with the edge of the display region AA and partially overlaps both the first part P1 and the second part P2 of the shielding layer BM when viewed along the top view direction TD of the display panel 10, and the shielding block BLK of the peripheral pixel includes at least one opening defining the display region of the peripheral pixel. The area of the display region of the peripheral pixel is less than the area of the display region of the inner pixel, that is, the overlapping area of the peripheral pixel unit 14 and the corresponding shielding block BLK is greater than the overlapping area of the inner pixel unit 12 and the corresponding shielding block BLK. In some embodiments, one of the peripheral pixel units 14 may be located at the end of one of the pixel unit rows or pixel unit columns, but not limited thereto. In some embodiments, the plurality of pixels of the display panel 10 may also optionally include dummy pixels. The dummy pixel includes a dummy pixel unit 16 and a shielding block BLK. The dummy pixel unit 16 is completely located in the peripheral region PA, that is, the area of the dummy pixel unit 16 is completely covered by the first portion P1 of the shielding layer BM, and the shielding block BLK of the dummy pixel does not have an opening, that is, the area of the display region of the dummy pixel is equal to 0. The dummy pixel units 16 are located at the ends of pixel unit rows or pixel unit columns. In embodiments having at least one peripheral pixel unit 14 between one end of the pixel unit row or the pixel unit column and the inner pixel unit 12, dummy pixel units 16 may be located between the end of the pixel unit row or pixel unit column and the at least one peripheral pixel unit 14. The shielding blocks BLK of the inner pixel, the peripheral pixel and the dummy pixel are respectively disposed corresponding to the inner pixel unit 12, peripheral pixel unit 14 and dummy pixel unit 16. Each shielding block BLK may be a part of the shielding layer BM, but not limited thereto. In this embodiment, the shielding blocks BLK of the peripheral pixel, the inner pixel, and the dummy pixel are respectively portions of the shielding layer BM overlapping the peripheral pixel unit 14, the inner pixel unit 12, and the dummy pixel unit 16, but not limited thereto. As shown in FIG. 2, the area of the shielding block BLK of the peripheral pixel is greater than the area of the shielding block BLK of the inner pixel, and the area of the shielding block BLK of the dummy pixel is greater than the area of the shielding block BLK of the peripheral pixel.

In addition, each pixel unit PU may include a plurality of sub-pixel units SPU, respectively corresponding to different colors, and each shielding block BLK may include a plurality of sub-shielding blocks SBLK, respectively corresponding to different sub-pixel units SPU and partially overlapping the corresponding sub-pixel units SPU. In other words, in this embodiment, each pixel may include a plurality of sub-pixels, and each sub-pixel includes a sub-pixel unit SPU and a sub-shielding block SBLK. In the disclosure, the sub-pixel unit SPU of the inner pixel unit 12, the sub-pixel unit SPU of the peripheral pixel unit 14, and the sub-pixel unit SPU of the dummy pixel unit 16 may be referred to as an inner sub-pixel units, a peripheral sub-pixel unit, and a dummy sub-pixel unit respectively, and the sub-pixel including the inner sub-pixel unit may be referred to as an inner sub-pixel, the sub-pixel including the peripheral sub-pixel unit may be referred to as a peripheral sub-pixel, and the sub-pixel including the dummy sub-pixel unit may be referred to as a dummy sub-pixel. For example, the number of sub-pixels of each pixel may be three, respectively corresponding to different colors, such as red sub-pixels, green sub-pixels and blue sub-pixels, but not limited thereto. The number of sub-pixel units SPU of each pixel unit PU may be three, and each shielding block BLK includes three sub-shielding blocks SBLK_1, SBLK_2, SBLK_3, which respectively correspond to and partially overlap the three sub-pixel units SPU of the pixel unit PU. As shown in FIG. 2, each pixel includes a pixel unit PU and a shielding block BLK, each pixel unit PU includes three sub-pixel units SPU, and each shielding block BLK includes three sub-shielding blocks SBLK_1, SBLK_2, SBLK_3. The shielding block BLK of each inner pixel has three openings (that is, each sub-shielding block SBLK of the inner pixel has one opening), which are disposed respectively corresponding to the three sub-pixel units SPU. Since a part and the other part of the region of each peripheral pixel are respectively located in the display region AA and the peripheral region PA, the shielding block BLK of each peripheral pixel has at least one opening corresponding to at least one sub-pixel unit SPU. For example, each sub-shielding block SBLK in a peripheral pixel has an opening (such as the peripheral pixel at the crossing of pixel row R(i+2) and pixel column C(j−1) in FIG. 2), or only one or two sub-shielding blocks SBLK in a peripheral pixel have the opening (such as the peripheral pixel at the crossing of pixel row R(i+2) and pixel column C(j−2), or the peripheral pixel at the crossing of pixel row R(i) and pixel column C(j) in FIG. 2). Since each dummy pixel is completely located in the peripheral region PA, the region of each dummy pixel is completely covered by the shielding layer BM, that is, the shielding block BLK of each dummy pixel does not have the opening. In this embodiment, the sub-pixel units SPU of each pixel unit PU may be arranged along the extending direction of the pixel row (e.g., the first direction D1), but not limited thereto. In some embodiments, the sub-pixel units SPU of each pixel unit PU may also be arranged along the extending direction of the pixel unit column (e.g., the second direction D2). In some embodiments, the shape of each sub-pixel unit SPU may be rectangular, parallelogram, rhombus, or other suitable shapes. In this embodiment, the sub-pixel units SPU in each pixel unit PU have the same size, but not limited thereto. In some embodiments, at least a part of the sub-pixel units SPU in each pixel unit may have different sizes. For example, in an embodiment where each pixel unit PU is composed of three sub-pixel units SPU, at least two of the three sub-pixel units SPU in each pixel unit PU may have the same size, or the sizes of the three sub-pixel units SPU in each pixel unit PU are different from each other. In other embodiments, the sub-pixel units SPU in each pixel unit PU may also have other arrangement, such as Pentile arrangement.

In this embodiment, the inner sub-pixel unit partially overlaps the second portion P2 of the shielding layer BM and does not overlap the first portion P1 of the shielding layer BM, that is, does not overlap the peripheral region PA. Each inner sub-pixel unit may correspond to the inner opening IO of the shielding layer BM. In this embodiment, the structures of the inner pixel units 12 may be identical to each other. In addition, the structures of the plurality of inner sub-pixel units in each inner pixel unit 12 may be identical to each other, but not limited thereto. For example, the inner sub-pixel units of each inner pixel unit 12 may include a first inner sub-pixel unit 12a, a second inner sub-pixel unit 12b, and a third inner sub-pixel unit 12c, and the first inner sub-pixel unit 12a, the second inner sub-pixel unit 12b, and the third inner sub-pixel unit 12c have the same structure, but are not limited thereto.

Furthermore, at least one peripheral sub-pixel unit of each peripheral pixel unit at least partially overlaps the first portion P1 of the shielding layer BM. In other words, the reference line RL passes through at least one peripheral sub-pixel unit of the peripheral pixel unit, that is, at least one peripheral sub-pixel unit of the peripheral pixel unit intersects with the edge of the display region AA when viewed along a top view direction TD of the display panel 10.

In detail, as shown in FIG. 2, the pixel located at the crossing of the pixel unit column C(j−1) and the pixel unit row R(i+2) intersects with the edge of the display region AA, and the area of the opening of the sub-shielding block SBLK of the leftmost sub-pixel in this pixel is less than the area of the opening of the sub-shielding block SBLK of the leftmost inner sub-pixel in the inner pixel (for example, the pixel located at the crossing of the pixel unit column C(j) and the pixel unit row R(i+2)). Because each pixel is composed of three sub-pixels, and the colors of the three sub-pixels are mixed to generate the color of the pixel, the color of the pixel located at the crossing of the pixel unit column C(j−1) and the pixel unit row R(i+2) will be different from expected, causing zigzag appearance at the edge of the non-rectangular display region AA when the user views the display panel 10. Similarly, the pixels located at the crossing of the pixel unit column C(j−1) and the pixel unit row R(i+1) and the pixels located at the crossing of the pixel unit column C(j) and the pixel unit row R(i) intersect with the edge of the display region AA, and the areas of the openings of the sub-shielding blocks SBLK of the three sub-pixels of each of the above two pixels are respectively less than the areas of the openings of the sub-shielding blocks SBLK of the three inner sub-pixels in the inner pixel. Therefore, the color of the pixel located at the crossing of the pixel unit column C(j−1) and the pixel unit row R(i+1) and the color of the pixel located at the crossing of the pixel unit column C(j) and the pixel unit row R(i) are also different from expected. Therefore, the present invention can adjust the structure of the peripheral pixel unit 14 to be different from that of the inner pixel unit 12, so that the transmittance of the peripheral pixel unit 14 is less than that of the inner pixel unit 12 at the same grey level, thereby decreasing luminance of at least a part of the peripheral pixels and reducing the zigzag appearance of the edge of the non-rectangular display region AA. As shown in FIG. 2, the plurality of peripheral pixel units 14 of the display panel 10 may include a plurality of first peripheral pixel units 141, in which the structures of the first peripheral sub-pixel units 141a, 141b, 141c of the first peripheral pixel unit 141 are different from the structures of the inner sub-pixel units 12a, 12b, 12c, respectively, so that the transmittances of the first peripheral sub-pixel units 141a, 141b, 141c are less than the transmittances of the inner sub-pixel units 12a, 12b, 12c, respectively. In addition, the structures of the first peripheral sub-pixel units 141a, 141b, 141c in the first peripheral pixel unit 141 are preferably the same, so as to simplify the design process of the display panel 10, but not limited thereto.

In the first peripheral pixel unit 141 of this embodiment, at least one of the peripheral sub-pixel units 141a, 141b, 141c can be completely covered by the shielding layer BM or has the peripheral opening PO less than the inner opening IO, so the overlapping area of the first peripheral pixel unit 141 and the shielding layer BM is greater than the overlapping area of the inner pixel unit 12 and the shielding layer BM. In this embodiment, the first peripheral sub-pixel units 141a, 141b, 141c of each first peripheral pixel unit 141 may have the same structure and transmittance, but not limited thereto.

In this embodiment, the first peripheral pixel unit 141 may include first peripheral sub-pixel units 141a, 141b, 141c, and the first peripheral sub-pixel units 141a, 141b, 141c have the same structure and transmittance. At least one of the first peripheral sub-pixel units 141a, 141b, 141c may partially overlap the first portion P1 of the shielding layer BM and intersect with the edge of the display region AA. Furthermore, in some embodiments, the area of one or two of the first peripheral sub-pixel units 141a, 141b, 141c may be completely covered by the shielding layer BM. For example, as the first peripheral pixel unit 141 located at the crossing of pixel row R(i−1) and pixel column C(j+1), the first peripheral pixel unit 141 located at the crossing of pixel row R(i) and pixel column C(j), and the first peripheral pixel unit 141 located at the crossing of pixel row R(i+1) and pixel column C(j−1) shown in FIG. 2, the overlapping area of the first peripheral sub-pixel unit 141b and the shielding layer BM and the overlapping area of the first peripheral sub-pixel unit 141c and the shielding layer BM may both be less than the overlapping area of the first peripheral sub-pixel unit 141a and the shielding layer BM, the overlapping area of the first peripheral sub-pixel unit 141c and the shielding layer BM is less than the overlapping area of the first peripheral sub-pixel unit 141b and the shielding layer BM, and the overlapping areas of the first peripheral sub-pixel units 141a, 141b, 141c and the shielding layer BM are respectively greater than the overlapping areas of the inner sub-pixel units 12a, 12b, 12c and the shielding layer BM. The regions of the first peripheral sub-pixel units 141a of the first peripheral pixel unit 141 located at the crossing of the pixel row R(i) and the pixel column C(j) and the first peripheral pixel unit 141 located at the crossing of the pixel row R(i+1) and the pixel column C(j−1) are completely covered by the shielding layer BM. As the first peripheral pixel unit 141 located at the crossing of the pixel row R(i−1) and the pixel column C(j+2) and the first peripheral pixel unit 141 located at the crossing of the pixel row R(i+2) and the pixel column C(j−1) shown in FIG. 2, the overlapping area of the first peripheral sub-pixel unit 141a and the shielding layer BM is greater than the overlapping area of the inner sub-pixel unit 12a and the shielding layer BM, and the overlapping areas of the first peripheral sub-pixel units 141b, 141c and the shielding layer BM are the same as the overlapping areas of the inner sub-pixel units 12b, 12c and the shielding layer BM, respectively. For example, in the first peripheral pixel unit 141 located at the crossing of the pixel row R(i+2) and the pixel column C(j−2), the regions of the first peripheral sub-pixel units 141a, 141b are completely covered by the shielding layer BM, the region of the first peripheral sub-pixel unit 141c is partially covered by the shielding layer BM, and the overlapping area of the first peripheral sub-pixel unit 141c and the shielding layer BM is greater than the overlapping area of the inner sub-pixel unit 12c and the shielding layer BM. In this embodiment, the structures of the first peripheral sub-pixel units 141a, 141b, 141c are different from those of the inner sub-pixel units 12a, 12b, 12c, respectively, and the transmittances of the first peripheral sub-pixel units 141a, 141b, 141c are less than the transmittances of the inner sub-pixel units 12a, 12b, 12c, respectively, so as to decrease luminance of the first peripheral pixel and reduce the zigzag appearance of the edge of the non-rectangular display region AA.

In some embodiments, the plurality of peripheral pixel units 14 of the display panel 10 may further include at least one second peripheral pixel unit 142, in which the first portion P1 of the shielding layer BM overlaps a portion of the second peripheral pixel unit 142, the overlapping area of the second peripheral pixel unit 142 and the shielding layer BM is greater than the overlapping area of the inner pixel unit 12 and the shielding layer BM, and the structure and transmittance of the second peripheral pixel unit 142 may be respectively the same as the structure and transmittance of each inner sub-pixel unit 12. The difference between the first peripheral pixel unit 141 and the second peripheral pixel unit 142 is described in detail below. For example, when a peripheral pixel unit 14 includes a plurality of peripheral sub-pixel units, and the overlapping area of one of the peripheral sub-pixel units and the first portion P1 of the shielding layer BM is greater than a certain proportion of the area of this peripheral sub-pixel unit, for example X %, so that the color of the pixel mixed by the three sub-pixels of the peripheral pixel including the peripheral pixel unit 14 differs greatly from the expected color. Accordingly, the present invention adjusts the structures of the peripheral sub-pixel units in the peripheral pixel unit 14, such that the structure of each peripheral sub-pixel unit in the peripheral pixel unit 14 is different from the structure of each inner sub-pixel unit in the inner pixel unit 12, and further the transmittance of each peripheral sub-pixel unit in the peripheral pixel unit 14 is less than the transmittance of each inner sub-pixel unit in the inner pixel unit 12. Thus, the light brightness of the peripheral pixels is reduced, thereby reducing the zigzag appearance of the edge of the non-rectangular display region AA and further improving the display quality of the display panel 10. The peripheral pixel unit 14 mentioned above may be the first peripheral pixel unit 141 of the present invention. When the overlapping area of one peripheral sub-pixel unit in the peripheral pixel unit 14 and the first portion P1 of the shielding layer BM is less than the certain proportion of the area of the peripheral sub-pixel unit, for example, X %, so that the color of the pixel mixed by the three sub-pixels of the peripheral pixel including the peripheral pixel unit 14 has less difference or no difference from the expected color, there is no need to adjust the structure of the peripheral pixel unit 14. That is, the structure and transmittance of each peripheral sub-pixel unit in the peripheral pixel unit 14 are respectively the same as the structure and transmittance of each inner sub-pixel unit in the inner pixel unit 12, thereby simplifying the design process of the display panel 10 and shortening the design time of the display panel 10. The peripheral pixel unit 14 mentioned above may be the second peripheral pixel unit 142 of the present invention. In this embodiment, X may be 10, but the value of X is not limited thereto. For example, all the pixel units of the display panel are generally designed to have the same structure, that is, all the pixel units will be designed to have the same structure as the inner pixel unit 12, and then the structure of at least one pixel unit is adjusted to be the structure of the peripheral pixel unit 14, so that the transmittances of the sub-pixel units in the adjusted pixel unit are reduced to lower the zigzag appearance of the edge of the non-rectangular display region AA. Therefore, when X is less, it means that the structures of more pixel units need to be adjusted to be the structures of sub-pixel units in the peripheral pixel unit 14, so that their transmittances are less than the transmittance of the inner pixel unit 12, that is, more peripheral pixels 14 need to be set as the first peripheral pixels 141, so that the edge of the non-rectangular display region AA are visually smoother. When X is greater, it means that the structures of less pixel units need to be adjusted to be the structures of peripheral pixel units 14, that is, the structures of more pixel units does not need to be adjusted (i.e., the structure of pixel units is maintained to be the same as that of inner pixel units 12), thus shortening the design time of non-rectangular display panel 10. The best value of X can be determined in consideration of reducing the zigzag appearance of the edge of the non-rectangular display region AA and shortening the design time of the non-rectangular display panel 10.

The second peripheral pixel unit 142 may include second peripheral sub-pixel units 142a, 142b, 142c, the overlapping area of the second peripheral pixel unit 142 and the corresponding shielding block BLK is greater than the overlapping area of the corresponding shielding block BLK of the inner pixel unit 12, and the structure and transmittance of each second peripheral sub-pixel unit 142a, 142b, 142c in the second peripheral pixel unit 142 are respectively the same as those of each inner sub-pixel unit 12a, 12b, 12c in the inner pixel unit 12. Please also refer to the peripheral pixel located at the crossing of the pixel row R(i+1) and the pixel column C(j) (the peripheral pixel indicated as the second peripheral pixel unit 142) and the peripheral pixel located at the crossing of the pixel row R(i+2) and the pixel column C(j−1) (the peripheral pixel indicated as the first peripheral pixel unit 141) shown in FIG. 2. Each of the two peripheral pixels mentioned above includes three peripheral sub-pixels, and the peripheral sub-pixel unit of the leftmost one of the peripheral sub-pixels in each of the two peripheral pixels mentioned above partially overlaps the first portion P1 of the shielding layer BM. Since the overlapping area of the leftmost peripheral sub-pixel unit in the peripheral pixel unit 14 located at the crossing of the pixel row R(i+1) and the pixel column C(j) and the first portion P1 of the shielding layer BM is less than a certain proportion (e.g., 10%) of the area of the leftmost peripheral sub-pixel, the structure of the peripheral pixel unit 14 of the peripheral pixel is not adjusted, and the structure of the peripheral pixel unit 14 is maintained to be the same as the structure of the inner pixel unit 12, thereby shortening the design time of the non-rectangular display panel 10. That is, the peripheral pixel unit 14 located at the crossing of the pixel row R(i+1) and the pixel column C(j) is set as the second peripheral pixel unit 142. The overlapping area of the leftmost one of the peripheral sub-pixel units in the peripheral pixel unit 14 located at the crossing of the pixel row R(i+2) and the pixel column C(j−1) and the first portion P1 of the shielding layer BM is greater than a certain proportion (e.g., 10%) of the area of the leftmost peripheral sub-pixel, so the structure of the peripheral pixel unit 14 of the peripheral pixel is adjusted to be different from that of the inner pixel unit 12, thereby decreasing the transmittance of the peripheral pixel unit 14 of the peripheral pixel to be less than that of the inner pixel unit 12. Accordingly, the zigzag appearance of the edge of the non-rectangular panel is reduced, that is, the peripheral pixel unit 14 located at the crossing of the pixel row R(i+2) and the pixel column C(j−1) is set as the first peripheral pixel unit 141.

The display panel 10 may further include a plurality of color filter blocks 18, respectively corresponding to the plurality of sub-pixel units SPU. The color filter blocks 18 may be disposed in the display region AA, respectively corresponding to the openings of the shielding layer BM and overlapping the corresponding openings, so that each sub-pixel has a corresponding color. For example, the plurality of color filter blocks 18 of the display panel 10 may include first color filter blocks 18a, second color filter blocks 18b, and third color filter blocks 18c, respectively having a first color, a second color, and a third color (e.g., red color, green color, and blue color). The first color filter block 18a, the second color filter block 18b, and the third color filter block 18c may respectively correspond to different sub-pixel units SPU in one of the pixels, and may be respectively a red filter block, a green filter block, and a blue filter block, but are not limited thereto. In some embodiments, a plurality of first color filter blocks 18a may be formed of a same first color filter layer, a plurality of second color filter blocks 18b may be formed of a same second color filter layer, and a plurality of third color filter blocks 18c may be formed of a same third color filter layer. In some embodiments, at least one of the color filter blocks 18 may be disposed in the peripheral region PA due to consideration of the photomask design of the color filter blocks 18. Because the first portion P1 of the shielding layer BM is located in the peripheral region PA, light passing through the color filter blocks 18 is blocked by the shielding layer BM and cannot penetrate. In other words, in an embodiment of one inner pixel including a plurality of inner sub-pixels and one peripheral pixel including a plurality of peripheral sub-pixels, the inner pixel includes an inner pixel unit 12, a shielding block BLK and a plurality of color filter blocks 18, and the inner sub-pixel includes an inner sub-pixel unit, a sub-shielding block SBLK and a color filter block 18. The peripheral pixel includes a peripheral pixel unit 14, a shielding block BLK and at least one color filter block 18. Each of the peripheral sub-pixels of the peripheral pixel includes a peripheral sub-pixel unit and a sub-shielding block SBLK, and at least one of the peripheral sub-pixels of the peripheral pixel further includes a corresponding color filter block 18. In addition, in the embodiment of the peripheral pixel unit 14 being the first peripheral pixel unit 141 and the peripheral sub-pixel unit being the first peripheral sub-pixel unit, the above-mentioned peripheral pixels and peripheral sub-pixels may be referred to as the first peripheral pixel and the first peripheral sub-pixel, respectively. In the embodiment of the peripheral pixel unit 14 being the second peripheral pixel unit 142 and the peripheral sub-pixel unit being the second peripheral sub-pixel unit, the above-mentioned peripheral pixels and peripheral sub-pixels may be referred to as second peripheral pixels and second peripheral sub-pixels, respectively.

In the inner pixel unit 12 of some embodiments, the first inner sub-pixel unit 12a, the second inner sub-pixel unit 12b and the third inner sub-pixel unit 12c may correspond to the first color filter block 18a, the second color filter block 18b, and the third color filter block 18c, respectively. In addition, the first color filter block 18a may cover the inner opening 10 corresponding to the first inner sub-pixel unit 12a, the second color filter block 18b may cover the inner opening 10 corresponding to the second inner sub-pixel unit 12b, and the third color filter block 18c may cover the inner opening 10 corresponding to the third inner sub-pixel unit 12c.

In the peripheral pixel unit 14 of some embodiments, the peripheral sub-pixel unit SPU with the opening corresponds to a color filter block. For example, the first peripheral sub-pixel units 141a, 141b, 141c of the first peripheral pixel unit 141 may respectively correspond to a first color filter block 18a, a second color filter block 18b and a third color filter block 18c. Alternatively, in some embodiments, when the region of one or two of the first peripheral sub-pixel units 141a, 141b, 141c is completely covered by the shielding layer BM, the one or two first peripheral sub-pixel unit 141a, 141b, 141c completely covered by the shielding layer BM does not correspond to the color filter block 18, while the remaining one or two first peripheral sub-pixel units 141a, 141b, 141c may respectively correspond to one color filter block 18, but not limited thereto. In some embodiments, because of the consideration of photomask design of the color filter block 18, the color filter block 18 may be correspondingly disposed in the region of the at least one of the first peripheral sub-pixel units 141a, 141b, 141c, and because the sub-shielding block SBLK located in the peripheral region PA does not have the opening, light passing through the color filter block 18 may be blocked by the sub-shielding block SBLK and cannot penetrate. In addition, since each of the peripheral sub-pixel units SPU of the second peripheral pixel unit 142 corresponds to a corresponding opening of the shielding layer BM, the second peripheral sub-pixel units 142a, 142b, and 142c of the second peripheral pixel unit 142 may respectively correspond to a first color filter block 18a, a second color filter block 18b, and a third color filter block 18c.

In this embodiment, the structure of each of the first peripheral sub-pixel units 141a, 141b, 141c in the first peripheral pixel unit 141 may be different from the structure of each of the inner sub-pixel units 12a, 12b, 12c, respectively, so that they have different transmittances, thereby reducing the zigzag appearance of the edge of the non-rectangular panel. The detailed description is as follows.

Figure 3:
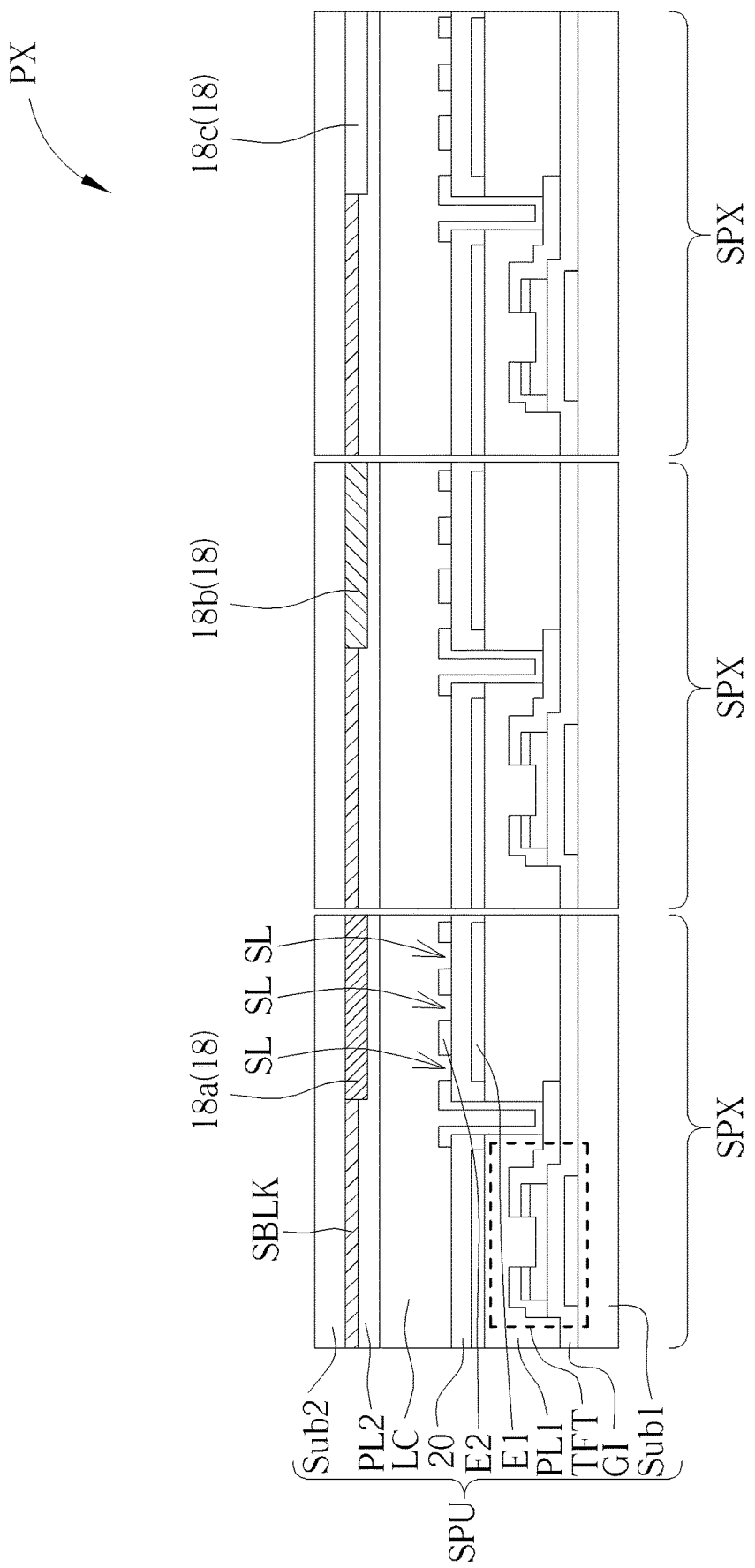
FIG. 3 is a schematic cross-sectional view of a pixel according to a first embodiment of the present invention.

In this embodiment, a pixel may include a pixel unit PU, a portion of the shielding layer BM (i.e., the shielding blocks BLK), the first color filter block 18a, the second color filter block 18b, and the third color filter block 18c. Please refer specifically to FIG. 3, which is a schematic cross-sectional view of a pixel according to a first embodiment of the present invention. In order to clearly show the cross-sectional structure of each pixel, FIG. 3 only shows a single pixel including three sub-pixels, but the present invention is not limited thereto. As shown in FIG. 3, the pixel PX may include a plurality of sub-pixels SPX, in which each sub-pixel SPX may include a sub-pixel unit SPU, a sub-shielding block SBLK, and a color filter block 18. It should be noted that the sub-pixel unit SPU does not include the sub-shielding block SBLK for defining the display region of the sub-pixel SPX and the color filter block 18 for defining the color of the sub-pixel, so the transmittances of the sub-pixel units SPU in the same pixel PX are not affected by the sizes of the openings of the sub-shielding blocks SBLK and the colors of the color filter blocks 18. In this embodiment, the sizes and the structures of the sub-pixel units SPU of the pixel PX are the same, and the transmittances of the sub-pixel units SPU of the pixel PX are the same, but are not limited thereto. In variant embodiments, the sizes and/or the structures of some of the sub-pixel units SPU in the pixel PX are the same, and/or the transmittances of some of the sub-pixel units SPU in the pixel PX are the same. In other variant embodiments, the sizes and/or the structures of the sub-pixel units SPU in the pixel PX are different from each other, and/or the transmittances of the sub-pixel units SPU in the pixel PX are different from each other. The sub-pixel unit SPU mainly includes elements for controlling the grey level of the sub-pixel. In this embodiment, each sub-pixel unit SPU may include a first electrode E1, a liquid crystal layer LC, and a second electrode E2 disposed between the first electrode E1 and the liquid crystal layer LC, and each second electrode E2 has a plurality of slits SL. The present invention does not limit the number of slits SL of the second electrode E2. For example, each second electrode E2 may have one slit SL. Through the slit SL of the second electrode E2, the electric field formed by the voltage difference between the second electrode E2 and the first electrode E1 can control the alignment direction of liquid crystal molecules in the liquid crystal layer LC, thereby adjusting the transmittance of the sub-pixel unit SPU. For example, the first electrode E1 and the second electrode E2 in this embodiment may be a common electrode and a pixel electrode respectively, but the present invention is not limited thereto. In some embodiments, the slits SL of the same second electrode E2 may have the same width. In some embodiments, each sub-pixel unit SPU may further include a first insulating layer 20 disposed between the first electrode E1 and the second electrode E2 for electrically insulating the first electrode E1 from the second electrode E2.

In some embodiments, each sub-pixel unit SPU may further include, for example, a portion of a lower substrate Sub1 and a portion of an upper substrate Sub2. In addition, each sub-pixel unit SPU may further include a thin film transistor TFT electrically connected to the second electrode E2, a portion of a data line (not shown), a portion of a scan line (not shown), a portion of a gate insulating layer GI, a portion of a second insulating layer PL1, and a portion of a lower alignment layer which are disposed on the lower substrate Sub1, and a portion of a third insulating layer PL2, and a portion of an upper alignment layer which are disposed on the upper substrate Sub2, but not limited thereto. In some embodiments, each sub-pixel unit SPU may further include a portion of a lower polarizer and a portion of an upper polarizer, but not limited thereto. It is worth mentioning that in some embodiments, the transmittance and aperture ratio of each sub-pixel unit SPU and the transmittance of the color filter block 18 may affect the transmittance of each sub-pixel SPX, in which the size of opening of the sub-shielding block SBLK may affect the aperture ratio, but not limited thereto. Those skilled in the art should know that the structure of sub-pixel units can vary according to the type of display panel, so the transmittance of each sub-pixel unit can be determined according to the type of display panel.

In this embodiment, each sub-pixel unit SPU in the same pixel PX may have the same structure and the same transmittance, but not limited thereto. Specifically, in the sub-pixel units SPU of the same pixel PX, the first electrodes E1 of may have the same size, the second electrodes E2 may have the same size, and the slits SL of the second electrodes E2 may also have the same width. Thus, when each sub-pixel unit SPU of the same pixel PX operates at the same grey level, the sub-pixel units SPU can have the same transmittance. For example, when the pixel PX shown in FIG. 3 is the first peripheral pixel including the first peripheral pixel unit 141 in FIG. 2, the first peripheral sub-pixel units 141a, 141b, 141c in the first peripheral pixel unit 141 may have the same structure and the same transmittance. When the pixel PX shown in FIG. 3 is the second peripheral pixel including the second peripheral pixel unit 142 in FIG. 2, the second peripheral sub-pixel units 142a, 142b, 142c in the second peripheral pixel unit 142 may have the same structure and the same transmittance. When the pixel PX shown in FIG. 3 is the inner pixel including the inner pixel unit 12 in FIG. 2, the inner sub-pixel units 12a, 12b, 12c may have the same structure and the same transmittance.

Figure 4:
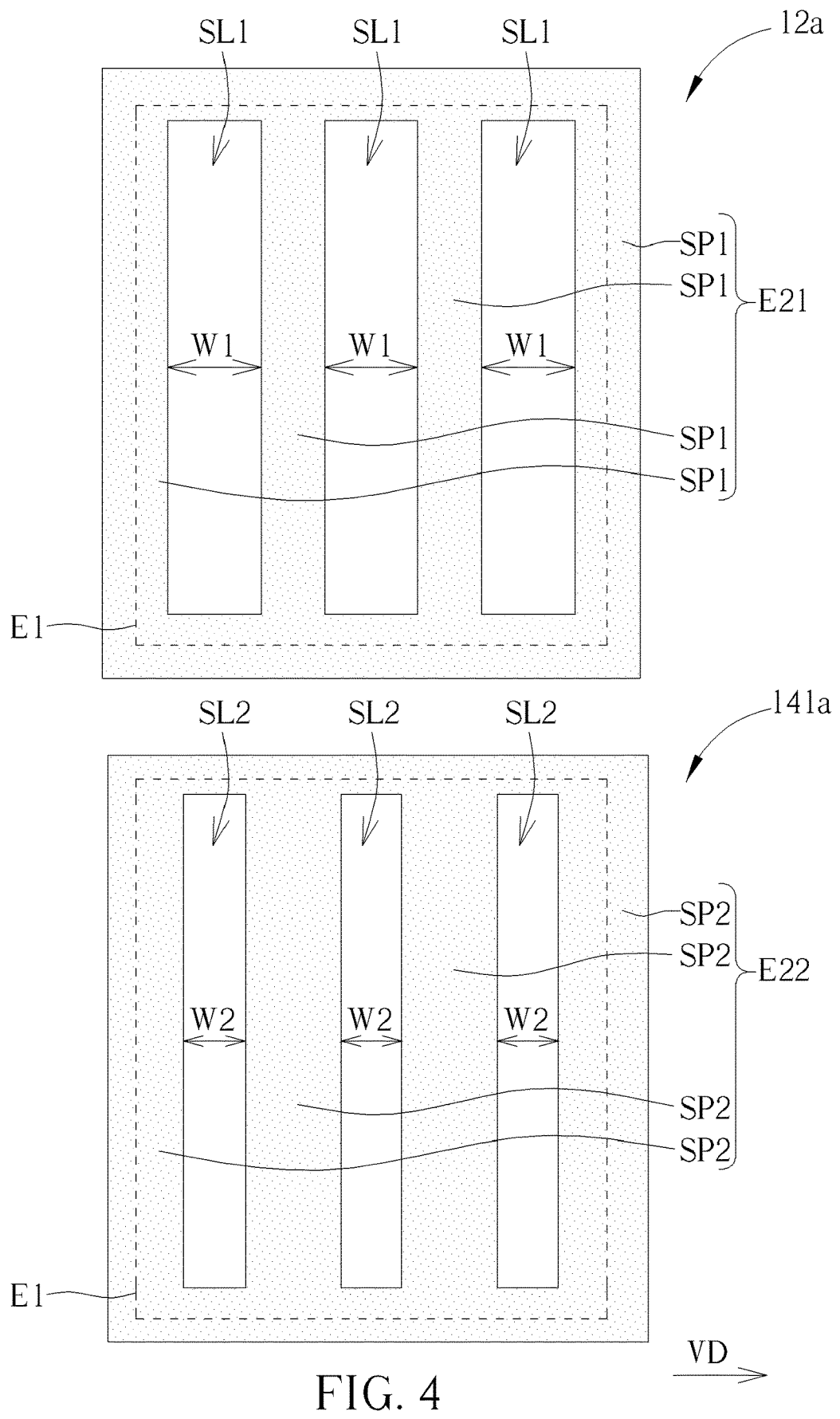
FIG. 4 is a schematic top view of the first electrodes and the second electrodes of the inner sub-pixel unit and the first peripheral sub-pixel unit of the first peripheral pixel unit according to a second embodiment of the present invention.

It should be noted that the width of the slit of the second electrode E2 and the area of the first electrode E1 in FIG. 3 may be different according to the location of the pixel PX, for example, the width of the slit of the second electrode E2 of the first peripheral pixel unit 141 may be different from the width of the slit of the second electrode E2 of the inner pixel unit. Please refer specifically to FIG. 4 as well as FIG. 2. FIG. 4 is a schematic top view of the first electrodes and the second electrodes of the inner sub-pixel unit and the first peripheral sub-pixel unit of the first peripheral pixel unit according to a second embodiment of the present invention, in which the inner sub-pixel unit and the first peripheral sub-pixel unit of the first peripheral pixel unit are respectively the inner sub-pixel unit 12a and the first peripheral sub-pixel unit 141a in FIG. 2 as an example, but not limited thereto. As shown in FIG. 4, the plurality of strip portions SP1 and the plurality of slits SL1 of the second electrode E21 of the inner sub-pixel unit 12a are alternately arranged along the horizontal direction VD, and the plurality of strip portions SP2 and the plurality of slits SL2 of the second electrode E22 of the first peripheral sub-pixel unit 141a are alternately arranged along the horizontal direction VD. In this embodiment, the width W1 of the slit SL1 of the second electrode E21 of the inner sub-pixel unit 12a in the horizontal direction VD is greater than the width W2 of the slit SL2 of the second electrode E22 of the first peripheral sub-pixel unit 141a in the horizontal direction VD, and the width of the strip portion SP1 of the second electrode E21 of the inner sub-pixel unit 12a in the horizontal direction VD may be less than the width of the strip portion SP2 of the second electrode E22 of the first peripheral sub-pixel unit 141a in the horizontal direction VD.

It is noted that since FIG. 3 shows a single pixel of a horizontal electrical field type liquid crystal display panel, the electric field distribution between the common electrode and the pixel electrode can be changed by adjusting the width of the slit, so that when the inner sub-pixel unit 12a and the first peripheral sub-pixel unit 141a operate at the same grey level, the transmittance of the first peripheral sub-pixel unit 141a is less than the transmittance of the inner sub-pixel unit 12a. By means of adjusting the transmittance of the first peripheral sub-pixel unit 141a to be less than the transmittance of the inner sub-pixel unit 12a, the brightness of light generated from the sub-pixel including the first peripheral sub-pixel unit 141a can be decreased. The above description takes the first peripheral sub-pixel unit 141a as an example, and the structure adjusting method of the first peripheral sub-pixel units 141b, 141c is similar to that of the first peripheral sub-pixel unit 141a and will not be detailed redundantly. In this embodiment, the structures of the first peripheral sub-pixel units 141a, 141b, 141c are different from the structures of the inner sub-pixel units 12a, 12b, 12c, respectively, and the transmittances of the first peripheral sub-pixel units 141a, 141b, 141c are less than the transmittances of the inner sub-pixel units 12a, 12b, 12c, respectively, so that the brightness of the sub-pixel including the first peripheral pixel unit 141 can be decreased. Accordingly, the color inconsistency of the pixels including the first peripheral pixel unit 141 viewed by the user can be mitigated, thereby reducing the zigzag appearance of the edge of the non-rectangular panel and further improving the display quality of the display panel 10.

In some embodiments, the width of each slit of the second peripheral sub-pixel unit of the second peripheral pixel unit 142 may be the same as the width W1 of each slit SL1 of the inner sub-pixel unit 12a, so that the structure and transmittance of the second peripheral sub-pixel unit of the second peripheral pixel unit 142 may be the same as the structure and transmittance of the inner sub-pixel unit 12a, respectively, so that the width of each slit of the second peripheral sub-pixel unit of the second peripheral pixel unit 142 may be greater than the width W2 of each slit SL2 of the first peripheral sub-pixel unit 141a.

The display panel of the present invention is not limited to the above embodiments. Other embodiments of the present invention are disclosed below. However, in order to simplify the description and highlight the differences between the embodiments, same components are labeled with the same symbol in the following, and the identical features will not be redundantly described.

Figure 5:
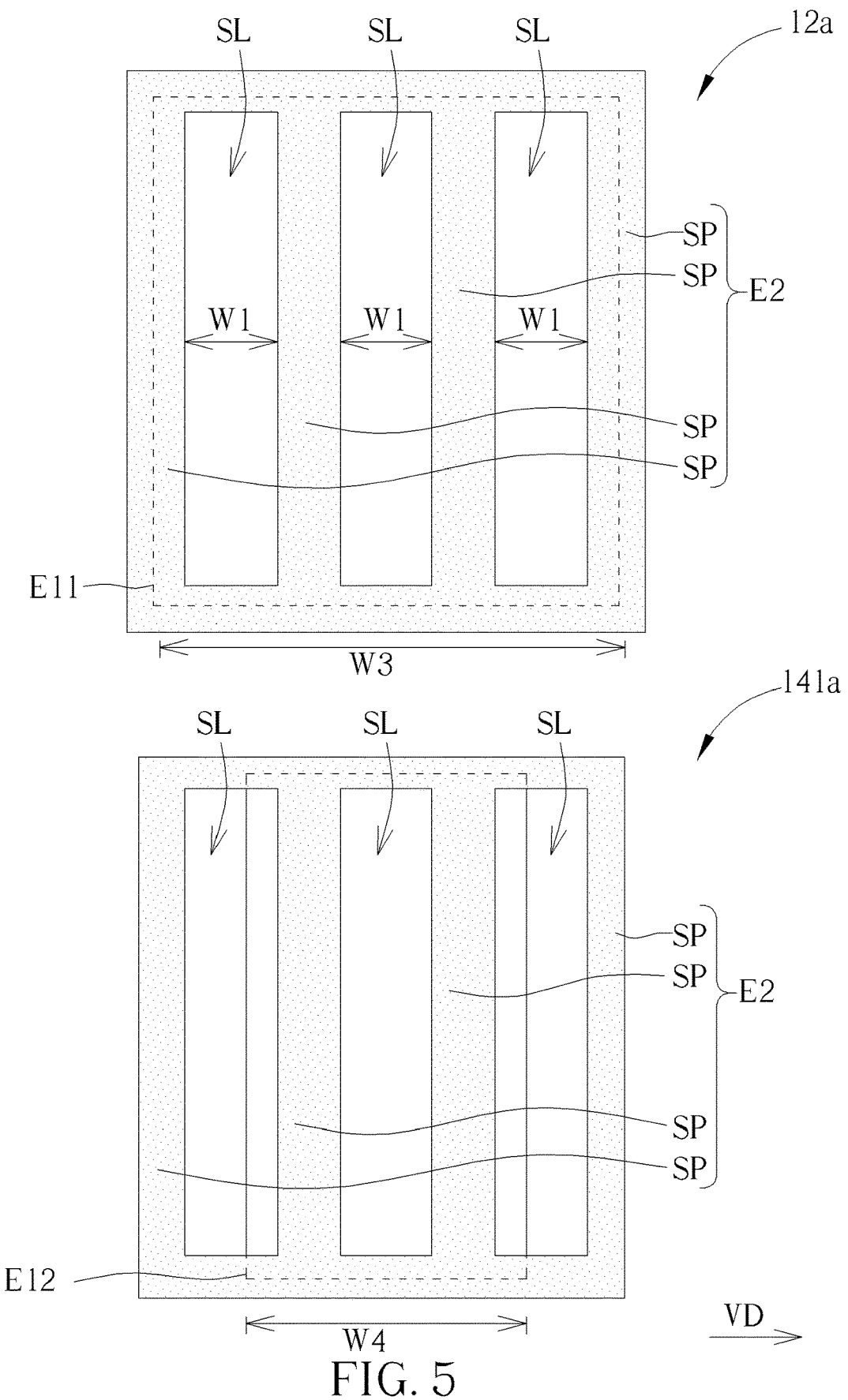
FIG. 5 is a schematic top view of the first electrode and the second electrode of the inner sub-pixel unit and the first peripheral sub-pixel unit of the first peripheral pixel unit according to a third embodiment of the present invention.

Please refer to FIG. 5 and FIG. 2. FIG. 5 is a schematic top view of the first electrode and the second electrode of the inner sub-pixel unit and the first peripheral sub-pixel unit of the first peripheral pixel unit according to a third embodiment of the present invention, in which the inner sub-pixel unit and the first peripheral sub-pixel unit of the first peripheral pixel unit are respectively the inner sub-pixel unit 12a and the first peripheral sub-pixel unit 141a in FIG. 2 as an example, but not limited thereto. As shown in FIG. 5, as compared with the first embodiment, the area of the first electrode E11 of the inner sub-pixel unit 12a of this embodiment is greater than the area of the first electrode E12 of the first peripheral sub-pixel unit 141a. Specifically, the width W3 of the first electrode E11 of the inner sub-pixel unit 12a in the horizontal direction VD in this embodiment may be, for example, greater than the width W4 of the first electrode E12 of the first peripheral sub-pixel unit 141a in the horizontal direction VD. Through reducing the area of the first electrode E12 of the first peripheral sub-pixel unit 141a, the transmittance of the first peripheral sub-pixel unit 141a can also be less than that of the inner sub-pixel unit 12a. The above description takes the first peripheral sub-pixel unit 141a as an example, and the structure adjusting method of the first peripheral sub-pixel units 141b, 141c is similar to that of the first peripheral sub-pixel unit 141a and will not be repeated herein. In this embodiment, the structures of the first peripheral sub-pixel units 141a, 141b, 141c are different from those of the inner sub-pixel units 12a, 12b, 12c, respectively, and the transmittances of the first peripheral sub-pixel units 141a, 141b, 141c are less than those of the inner sub-pixel units 12a, 12b, 12c, respectively, thereby decreasing the brightness of the pixel including the first peripheral pixel unit 141, reducing the zigzag appearance of the edge of the non-rectangular panel, and improving the display quality of the display panel. In this embodiment, the width of the slit SL of the second electrode E2 of the inner sub-pixel unit 12a may be the same as the width of the slit SL of the second electrode E2 of the first peripheral sub-pixel unit 141a, and the width of the strip portion SP of the second electrode E2 of the inner sub-pixel unit 12a may be the same as the width of the strip portion SP of the second electrode E2 of the first peripheral sub-pixel unit 141a, but not limited thereto. In some embodiments, the width of the slit SL of the second electrode E2 of the inner sub-pixel unit 12a may be greater than the width of the slit SL of the second electrode E2 of the first peripheral sub-pixel unit 141a, and the width of the strip portion SP of the second electrode E2 of the inner sub-pixel unit 12a may be less than the width of the strip portion SP of the second electrode E2 of the first peripheral sub-pixel unit 141a. That is, the design of the slits SL and the strip portions SP of the second electrodes E2 of the inner sub-pixel unit 12a and the first peripheral sub-pixel unit 141a in the second embodiment are combined with the design of the first electrodes E1 of the inner sub-pixel unit 12a and the first peripheral sub-pixel unit 141a in the third embodiment, so that the transmittance of the first peripheral sub-pixel unit 141a is less than that of the inner sub-pixel unit 12a at the same grey level. That is, when the inner pixel and the first peripheral pixel are driven with the same driving voltage, for example, when the voltage difference between the first electrode E1 and the second electrode E2 in the first peripheral sub-pixel unit 141a is the same as the voltage difference between the first electrode E1 and the first electrode E2 of the inner sub-pixel unit 12a, the transmittance of the first peripheral sub-pixel unit 141a is less than that of the inner sub-pixel unit 12a, thereby decreasing the brightness of the first peripheral pixel.

In some embodiments, the area of the first electrode of the peripheral sub-pixel unit of the second peripheral pixel unit 142 may be the same as the area of the first electrode E11 of the inner sub-pixel unit 12a and greater than the area of the first electrode E12 of the first peripheral sub-pixel unit 141a.

Figure 6:
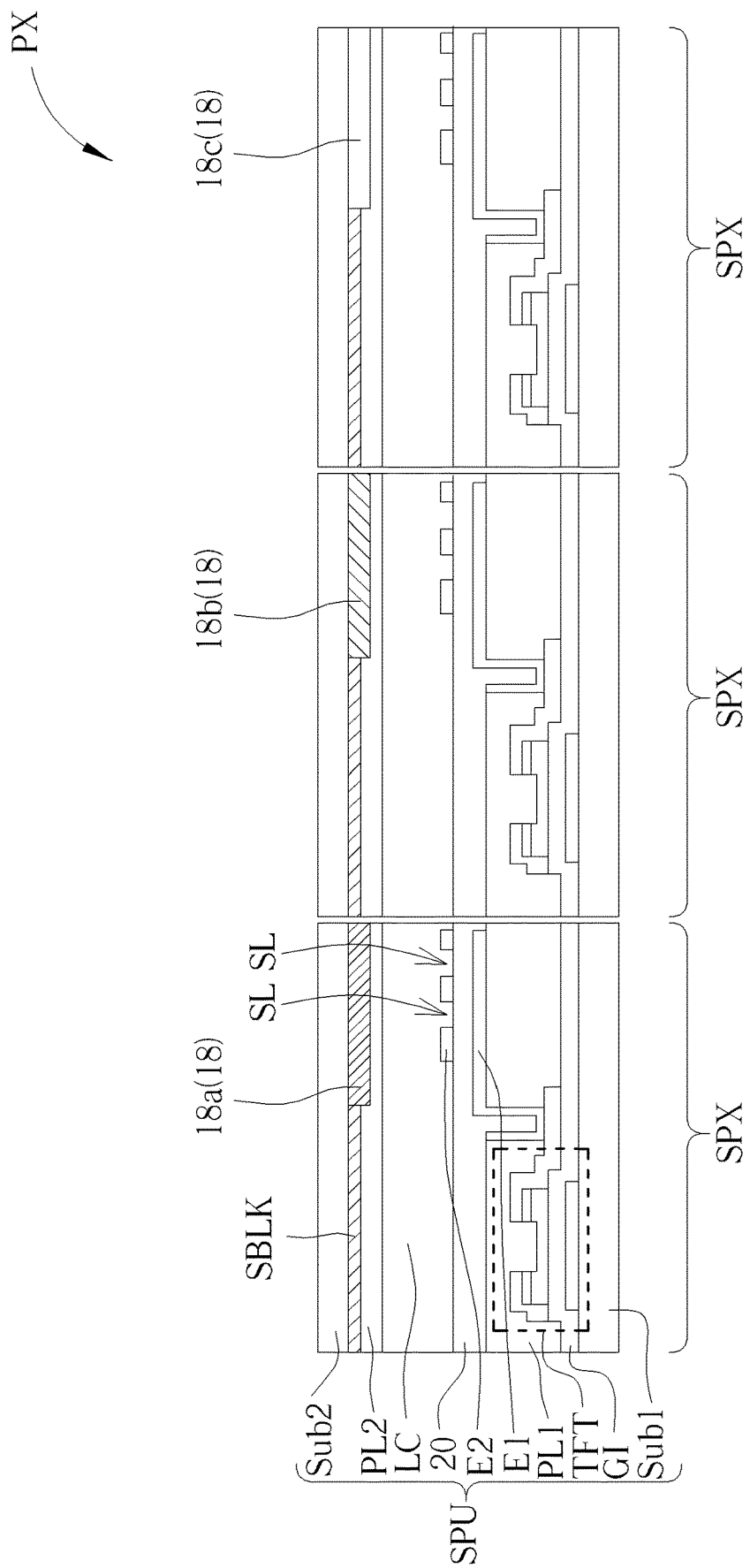
FIG. 6 is a schematic cross-sectional view of a pixel according to a variant embodiment of the first embodiment of FIG. 3 of the present invention.

Please refer to FIG. 6, which is a schematic cross-sectional view of a pixel according to a variant embodiment of the first embodiment of FIG. 3 of the present invention. In this variant embodiment, the first electrode E1 may be a pixel electrode electrically connected to the thin film transistor TFT, and the second electrode E2 may be a common electrode having the slits SL. In some embodiments, the slits SL of the same second electrode E2 may be the same as each other. In some embodiments, as shown in FIG. 4, the width of each slit SL1 of the second electrode E21 of the inner sub-pixel unit 12a serving as a common electrode may be greater than the width of each slit SL2 of the second electrode E22 of the first peripheral sub-pixel unit 141a serving as a common electrode. In some embodiments, as shown in FIG. 5, the width of the first electrode E12 of the first peripheral sub-pixel unit 141a serving as the pixel electrode may be less than the width of the first electrode E11 of the inner sub-pixel unit 12a serving as the pixel electrode, for example. Accordingly, the brightness of the pixels including the first peripheral pixel units 141 can be decreased, thereby mitigating the color inconsistency of the pixels including the first peripheral pixel units 141 viewed by the user and reducing the zigzag appearance of the edge of the non-rectangular panel to improve the display quality of the display panel.

Figure 7:
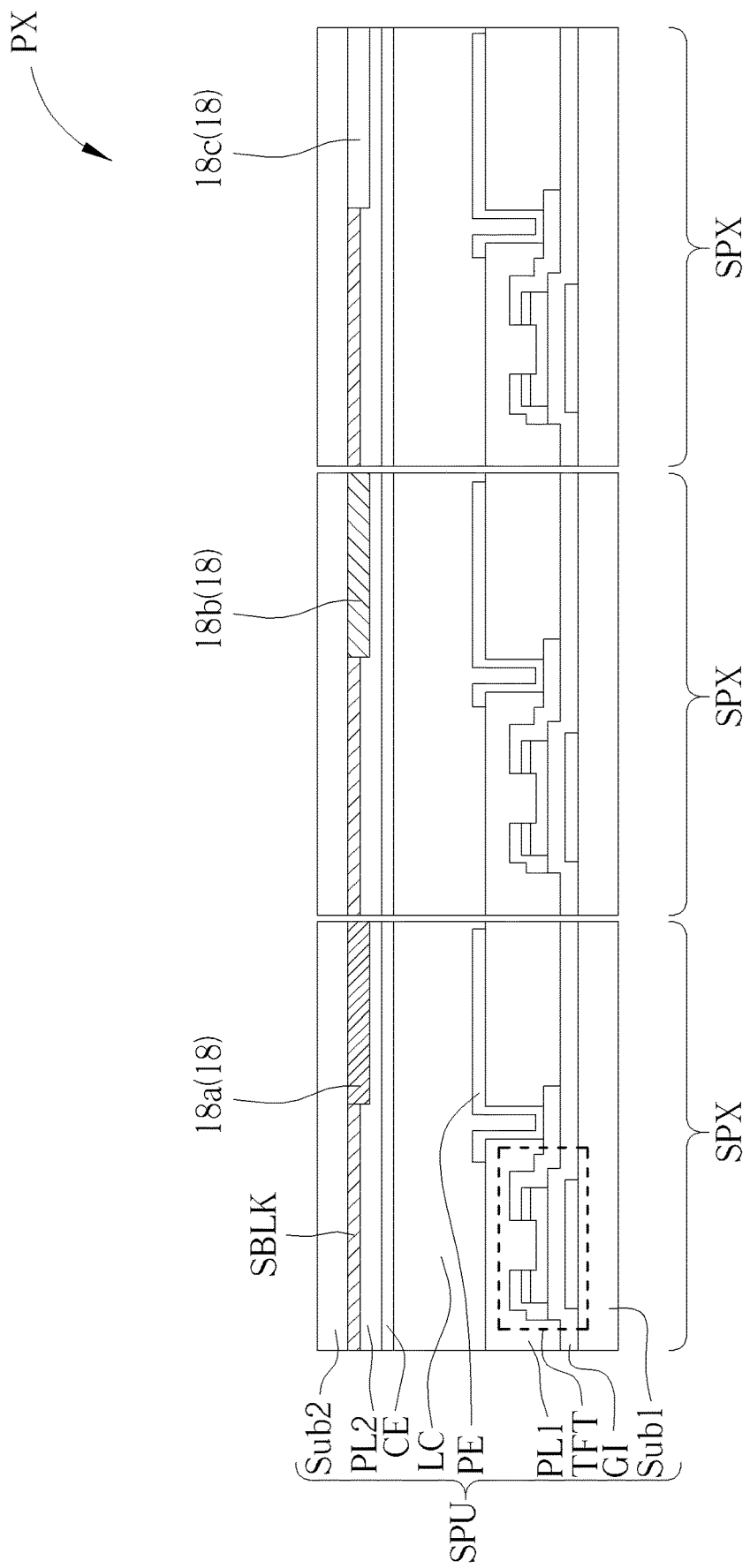
FIG. 7 is a schematic cross-sectional view of a pixel according to a fourth embodiment of the present invention.

Please refer to FIG. 7, which is a schematic cross-sectional view of a pixel according to a fourth embodiment of the present invention. As shown in FIG. 7, the liquid crystal layer LC of each sub-pixel SPX of this embodiment is located between the first electrode and the second electrode. For example, the first electrode located between the upper substrate Sub1 and the liquid crystal layer LC may be the common electrode CE, and the second electrode located between the lower substrate Sub2 and the liquid crystal layer LC may be the pixel electrode PE. In this embodiment, the pixel electrodes PE of the sub-pixels SPX located in the same pixel PX may have the same area.

Figure 8:
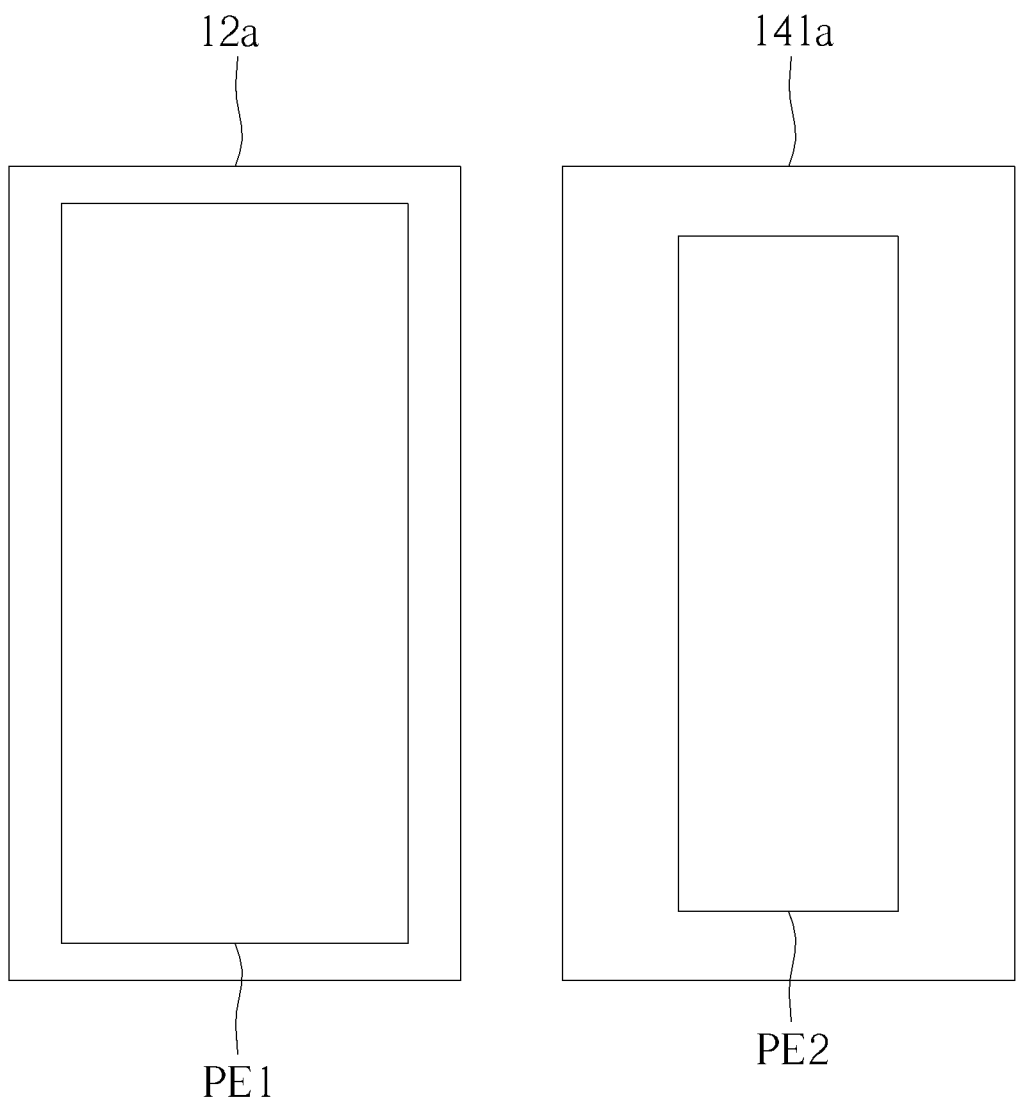
FIG. 8 is a schematic top view of the first electrode and the second electrode of the inner sub-pixel unit and the peripheral sub-pixel unit of the first peripheral pixel unit of FIG. 7 according to a fifth embodiment of the present invention.

Please refer to FIG. 8 together with FIG. 2 and FIG. 7. FIG. 8 is a schematic top view of the first electrode and the second electrode of the inner sub-pixel unit and the peripheral sub-pixel unit of the first peripheral pixel unit of FIG. 7 according to a fifth embodiment of the present invention, in which the inner sub-pixel unit and the peripheral sub-pixel unit of the first peripheral pixel unit are respectively the inner sub-pixel unit 12a and the first peripheral sub-pixel unit 141a of the first peripheral pixel unit 141 as an example in FIG. 2, but not limited thereto. As shown in FIG. 8, in this embodiment, the area of the pixel electrode PE1 of the inner sub-pixel unit 12a may be greater than the area of the pixel electrode PE2 of the first peripheral sub-pixel unit 141a. By reducing the area of the pixel electrode PE2 of the first peripheral sub-pixel unit 141a, the transmittance of the first peripheral sub-pixel unit 141a can also be less than that of the inner sub-pixel unit 12a. The above description takes the first peripheral sub-pixel unit 141a as an example, and the methods for adjusting the structures of the first peripheral sub-pixel units 141b, 141c are similar to that of the first peripheral sub-pixel unit 141a and will not be repeated herein. In this embodiment, the structures of the first peripheral sub-pixel units 141a, 141b, 141c are different from the structures of the inner sub-pixel units 12a, 12b, 12c, respectively, and the transmittances of the first peripheral sub-pixel units 141a, 141b, 141c are less than those of the inner sub-pixel units 12a, 12b, 12c, respectively, thereby reducing zigzag appearance of the edge of the non-rectangular panel and improving the display quality of the display panel.

In some embodiments, the area of the pixel electrode of the peripheral sub-pixel unit of the second peripheral pixel unit 142 may be the same as the area of the pixel electrode of the inner sub-pixel unit and greater than the area of the pixel electrode of the peripheral sub-pixel unit of the first peripheral pixel unit 141.

In summary, in the display panel of the present invention, through the area difference between the first electrodes, the width difference between slits of the second electrodes and the area difference between the pixel electrodes of the sub-pixel units, the transmittance of the peripheral sub-pixel unit of the first peripheral pixel unit can be adjusted to be less than the transmittance of the inner sub-pixel unit, thereby decreasing the brightness of the light generated from the sub-pixels of the peripheral sub-pixel unit corresponding to the first peripheral pixel unit. In addition, since the peripheral sub-pixel units of the same first peripheral pixel unit have the same structure and transmittance, the brightness of the sub-pixels corresponding to the first peripheral pixel unit can be decreased together, thereby mitigating the color inconsistency of the pixels including the first peripheral pixel units viewed by the user and even preventing the user from seeing the pixels generating unexpected colors. Therefore, the probability that pixels corresponding to the first peripheral pixel units intersecting with the curved reference line are perceived by the user can be reduced, thereby improving the display quality of the display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel having a display region and a peripheral region, comprising:
    a plurality of pixel units, comprising:
        an inner pixel unit disposed in the display region, and the inner pixel unit comprising three inner sub-pixel units;
        a first peripheral pixel unit disposed in both the display region and the peripheral region, and the first peripheral pixel unit comprising three first peripheral sub-pixel units, wherein when viewed along a top view direction of the display panel, a size of the first peripheral pixel unit is the same as a size of the inner pixel unit, and sizes of the first peripheral sub-pixel units are the same as each other; and
        a dummy pixel unit completely disposed in the peripheral region, the first peripheral pixel unit being disposed between the inner pixel unit and the dummy pixel unit in a pixel row, and the dummy pixel unit comprising three dummy sub-pixel units; and
    a shielding layer, at least a part of the shielding layer being disposed in the peripheral region, wherein when viewed along the top view direction of the display panel, an area of the first peripheral pixel unit is partially covered by the at least a part of the shielding layer, and an area of the dummy pixel unit is completely covered by the at least a part of the shielding layer;
    wherein a shape of the display region is non-rectangular, and a structure of the first peripheral pixel unit is different from a structure of the inner pixel unit, and
    wherein each of the inner sub-pixel units and the first peripheral sub-pixel units comprises a first electrode, a liquid crystal layer and a second electrode disposed between the first electrode and the liquid crystal layer, each of the second electrodes has at least one slit, a width of a shortest side of the slit of each of the inner sub-pixel units is greater than a width of a shortest side of the slit of each of the first peripheral sub-pixel units, and the widths of the shortest sides of the slits of the first peripheral sub-pixel units are the same as each other.

2. The display panel as claimed in claim 1, wherein the shielding layer comprises two peripheral openings, the peripheral openings respectively overlap two of the first peripheral sub-pixel units, wherein each of the peripheral openings has an inclined edge, and the inclined edges are not parallel to sides of the first peripheral sub-pixel units.

3. The display panel as claimed in claim 1, wherein an overlapping area of one of the first peripheral sub-pixel units of the first peripheral pixel unit and the shielding layer is greater than an overlapping area of another of the first peripheral sub-pixel units of the first peripheral pixel unit and the shielding layer.

4. The display panel as claimed in claim 1, wherein structures of the first peripheral sub-pixel units of the first peripheral pixel unit are identical to each other, structures of the inner sub-pixel units of the inner pixel unit are identical to each other, and the structure of each of the first peripheral sub-pixel units is different from the structure of each of the inner sub-pixel units.

5. The display panel as claimed in claim 4, further comprising a plurality of color filter blocks, wherein each of the inner sub-pixel units is overlapped with a corresponding one of the color filter blocks, and one of the first peripheral sub-pixel units is overlapped with a corresponding one of the color filter blocks.

6. The display panel as claimed in claim 1, wherein one of the first electrode and the second electrode is a pixel electrode, and the other of the first electrode and the second electrode is a common electrode.

7. The display panel as claimed in claim 1, wherein an overlapping area of the dummy pixel unit and the shielding layer is greater than an overlapping area of the first peripheral pixel unit and the shielding layer, and the overlapping area of the first peripheral pixel unit and the shielding layer is greater than an overlapping area of the inner pixel unit and the shielding layer.

8. A display panel having a display region and a peripheral region, comprising:
    a plurality of pixels, comprising:
        a first peripheral pixel disposed in both the display region and the peripheral region, wherein the first peripheral pixel comprises a first peripheral pixel unit and a first shielding block, the first peripheral pixel unit comprises three first peripheral sub-pixel units, the first shielding block comprises three first sub-shielding blocks respectively overlapping the first peripheral sub-pixel units, and an area of the first peripheral pixel unit is partially covered by the first shielding block when viewed along a top view direction of the display panel;

a dummy pixel completely disposed in the peripheral region, wherein the dummy pixel comprises a dummy pixel unit and a second shielding block, the dummy pixel unit comprises three dummy sub-pixel units, and an area of the dummy pixel unit is completely covered by the second shielding block when viewed along the top view direction of the display panel; and an inner pixel disposed in the display region, wherein the first peripheral pixel is disposed between the inner pixel unit and the dummy pixel in a pixel row, the inner pixel comprises an inner pixel unit and a third shielding block, the inner pixel unit comprises three inner sub-pixel units, the third shielding block comprises three second sub-shielding blocks respectively overlapping the inner sub-pixel units, and an area of the inner pixel unit is partially covered by the third shielding block;

wherein a shape of the display region is non-rectangular, and a structure of the first peripheral pixel unit is different from a structure of the inner pixel unit, wherein when viewed along the top view direction of the display panel, sizes of the first peripheral pixel and the inner pixel are the same as each other, and sizes of the first peripheral sub-pixel units are the same as each other, and wherein each of the inner sub-pixel units and the first peripheral sub-pixel units comprises a first electrode, a liquid crystal layer and a second electrode disposed between the first electrode and the liquid crystal layer, each of the second electrodes has at least one slit, and a width of a shortest side of the slit of each of the inner sub-pixel units is greater than a width of a shortest side of the slit of each of the first peripheral sub-pixel units.

9. The display panel as claimed in claim 8, wherein the first shielding block comprises two peripheral openings, the peripheral openings respectively overlap two of the first peripheral sub-pixel units, wherein each of the peripheral openings has an inclined edge, and the inclined edges are not parallel to sides of the first peripheral sub-pixel units.

10. The display panel as claimed in claim 8, wherein areas of the first sub-shielding blocks are different from each other.

11. The display panel as claimed in claim 8, wherein structures of the first peripheral sub-pixel units of the first peripheral pixel unit are identical to each other, structures of the inner sub-pixel units of the inner pixel unit are identical to each other, and the structure of each of the first peripheral sub-pixel units is different from the structure of each of the inner sub-pixel units.

12. The display panel as claimed in claim 11, wherein the pixels further comprising a plurality of color filter blocks, wherein each of the inner sub-pixel units is overlapped with a corresponding one of the color filter blocks, and one of the first peripheral sub-pixel units is overlapped with a corresponding one of the color filter blocks.

13. The display panel as claimed in claim 8, wherein one of the first electrode and the second electrode is a pixel electrode, and the other of the first electrode and the second electrode is a common electrode.

14. The display panel as claimed in claim 8, wherein an area of the second shielding block of the dummy pixel is greater than an area of the first shielding block of the first peripheral pixel, and the area of the first shielding block of the first peripheral pixel is greater than an area of the third shielding block of the inner pixel.

* * * * *